(12) United States Patent
Siciliani et al.

(10) Patent No.: US 11,740,987 B2
(45) Date of Patent: Aug. 29, 2023

(54) AUTOMATIC CHIP INITIALIZATION RETRY

(71) Applicant: Micron Technology, Inc., Boise, ID (US)

(72) Inventors: Umberto Siciliani, Rubano (IT); Domenico Monteleone, Padua (IT)

(73) Assignee: Micron Technology, Inc., Boise, ID (US)

( * ) Notice: Subject to any disclaimer, the term of this patent is extended or adjusted under 35 U.S.C. 154(b) by 5 days.

(21) Appl. No.: 17/583,407

(22) Filed: Jan. 25, 2022

(65) Prior Publication Data

US 2022/0405182 A1 Dec. 22, 2022

Related U.S. Application Data

(60) Provisional application No. 63/212,257, filed on Jun. 18, 2021.

(51) Int. Cl.
*G06F 11/30* (2006.01)
*G06F 11/07* (2006.01)
(Continued)

(52) U.S. Cl.
CPC .......... *G06F 11/3037* (2013.01); *G06F 3/064* (2013.01); *G06F 3/0619* (2013.01); *G06F 3/0632* (2013.01); *G06F 3/0679* (2013.01); *G06F 11/076* (2013.01); *G06F 11/0772* (2013.01); *G06F 11/1435* (2013.01); *G06F 11/1469* (2013.01)

(58) Field of Classification Search
None
See application file for complete search history.

(56) References Cited

U.S. PATENT DOCUMENTS

2004/0133709 A1* 7/2004 Boehm ............... G06F 1/22
710/15
2007/0095927 A1* 5/2007 Pesonen ............ G06F 21/73
717/136
(Continued)

OTHER PUBLICATIONS

Branstad et al., "Very Large Scale Integration Chip Initialization Function", Aug. 1, 1995, IBM TDB Archive, IPCOM000116202D (Year: 1995).*

*Primary Examiner* — Daniel F. McMahon
(74) *Attorney, Agent, or Firm* — Lowenstein Sandler LLP

(57) ABSTRACT

A system includes a memory array and control logic, operatively coupled to the memory array, to perform operations including causing, during chip initialization, a first attempt of a chip initialization process to be performed based on a first configuration. The first configuration includes a first set of control settings for reading a block of the memory array during the first attempt. The operations further include determining that the first attempt has failed, and, in response to determining that the first attempt has failed, causing an automatic chip initialization retry process to be performed. Causing the automatic chip initialization retry process to be performed includes causing a second attempt of the chip initialization process to be performed using a second configuration. The second configuration includes a second set of control settings different from the first set of control settings for reading the block during the second attempt.

20 Claims, 5 Drawing Sheets

(51) Int. Cl.
*G06F 11/14* (2006.01)
*G06F 3/06* (2006.01)

(56) References Cited

U.S. PATENT DOCUMENTS

| | | | |
|---|---|---|---|
| 2007/0241768 A1* | 10/2007 | Erickson | G06F 21/71 326/8 |
| 2008/0320214 A1* | 12/2008 | Ma | G06F 3/064 711/E12.008 |
| 2010/0183154 A1* | 7/2010 | Graunke | H04L 9/0827 380/278 |
| 2011/0231640 A1* | 9/2011 | Avadhanam | G06F 9/4403 713/2 |
| 2013/0166893 A1* | 6/2013 | Dusija | G06F 8/654 713/2 |
| 2014/0122922 A1* | 5/2014 | Hunt | G06F 11/073 714/E11.023 |
| 2016/0077823 A1* | 3/2016 | Zhang | G06F 8/65 717/171 |
| 2017/0147440 A1* | 5/2017 | Chang | G06F 11/1417 |
| 2019/0033374 A1* | 1/2019 | Bhagwat | G01R 31/31701 |
| 2022/0059173 A1* | 2/2022 | Hansen | G06F 3/0679 |

\* cited by examiner

AUTOMATIC CHIP INITIALIZATION RETRY

RELATED APPLICATION

This application claims the benefit of U.S. Provisional Application 63/212,257 filed on Jun. 18, 2021, the entire content of which is incorporated by reference herein.

TECHNICAL FIELD

Embodiments of the disclosure relate generally to memory sub-systems, and more specifically, relate to automatic chip initialization retry.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
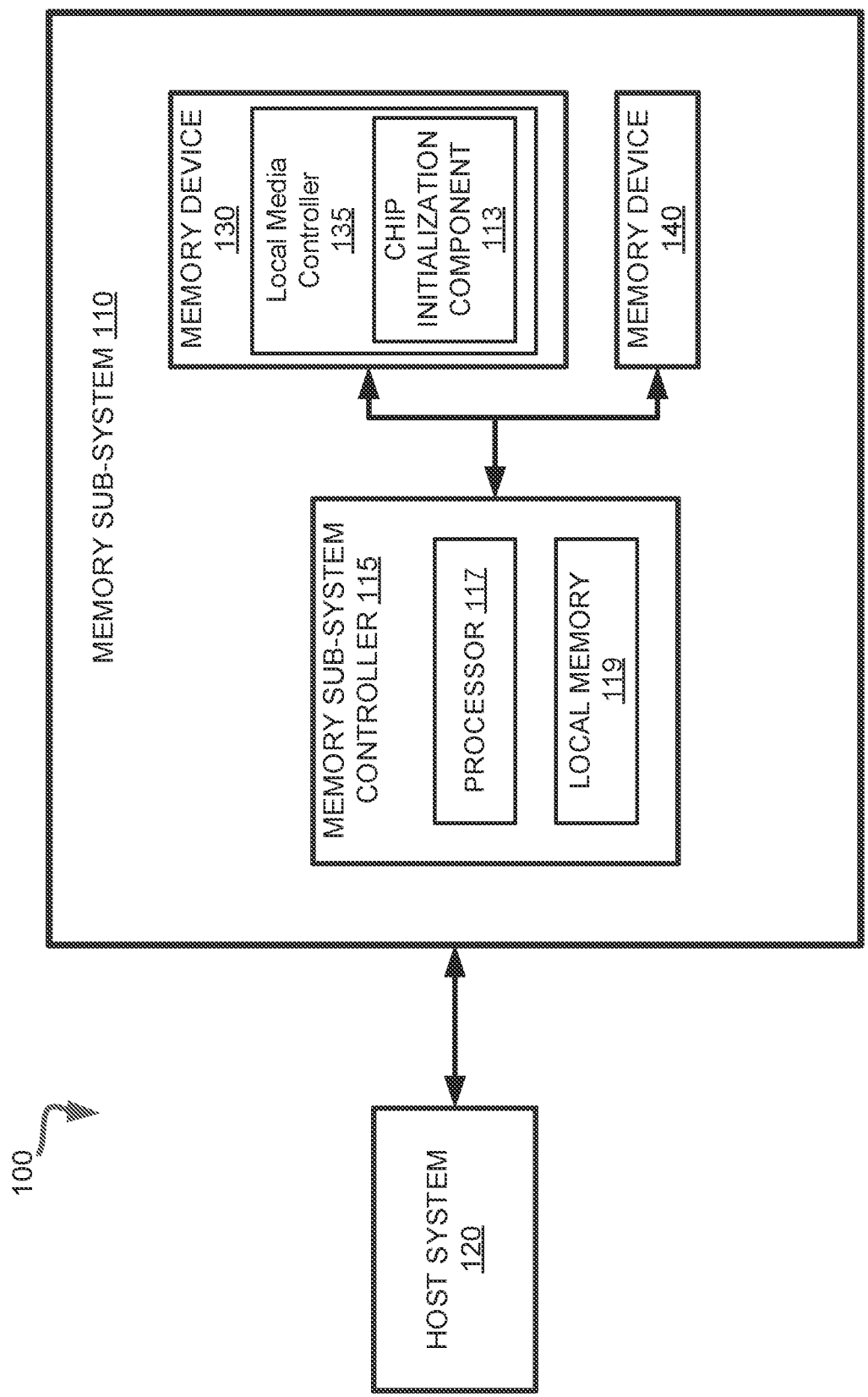
FIG. 1 illustrates an example computing system that includes a memory sub-system in accordance with some embodiments of the present disclosure.

Aspects of the present disclosure are directed to automatic chip initialization retry. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a negative-and (NAND) memory device. Other examples of non-volatile memory devices are described below in conjunction with FIG. 1. A non-volatile memory device is a package of one or more dies. Each die can consist of one or more planes. For some types of non-volatile memory devices (e.g., NAND devices), each plane consists of a set of physical blocks. Each block consists of a set of pages. Each page consists of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

Non-volatile memory devices can be optimized for particular applications. For example, a non-volatile memory device can be optimized for a mass-storage application, a mobile communication application, a desktop computing application, etc. A non-volatile memory device can be optimized by initializing or overwriting a set of trim registers in the memory device to desired values. If the non-volatile memory device is not optimized for the particular application, operation of the memory sub-system can be unreliable and/or have performance issues. A trim profile can include a packet of information that identifies the address location of a trim register to be modified, command information corresponding to an action to be performed, and data corresponding to the action to be performed. The trim profile can be stored in a data structure (e.g., table).

When a memory sub-system is powered on, a local media controller located on the memory device (e.g., NAND device) can receive an initialization command from a memory sub-system controller (e.g., SSD controller) to perform a chip initialization process. Information that is needed to perform the chip initialization process can be obtained from the memory sub-system controller (e.g., an initial read level corresponding to a trim profile). The information can include e.g., static trims and/or dynamic trims. The local media controller can determine if the previous attempt to initialize the memory device (i.e., a chip initialization operation) has passed or failed by looking at a status register corresponding to the initialization status (e.g., a "0" indicates pass and "1" indicates fail). A chip initialization operation can fail for a variety of causes. For example, there can be a missing configuration (e.g., trim data).

In the case of a chip initialization operation failure, the local media controller can perform a chip initialization retry operation using a new read level different from the initial read level (e.g., a lower read level). For example, after the failure, the memory sub-system controller can provide the local media controller with new information for performing another chip initialization process (e.g., a new read level corresponding to a different trim profile). Accordingly, since certain chip initialization retry operations can require that the memory sub-system provide an initialization command and read level for each chip initialization retry attempt, the memory sub-system controller keeps track of all chip initialization attempts to perform chip initialization operations.

Aspects of the present disclosure address the above and other deficiencies by providing a memory device that can perform an automatic chip initialization retry process to recover when the memory device (e.g., NAND device) fails to properly initialize after a power-on event. More specifically, in the case of a failure of an initial chip initialization operation, the automatic chip initialization retry process attempts to perform successful chip initialization without requiring additional commands from a requestor (e.g., a memory sub-system controller or host system). Since the local media controller performs the chip initialization retry process automatically, the memory sub-system controller does not send a command to the local media controller to perform each additional retry attempt. In other words, the automatic chip initialization retry process performed by the local media controller is "hidden" from the memory sub-system controller. Therefore, if a failure occurs at some point in the middle of the chip initialization process, the chip initialization retry process can be restarted from where the failure occurred using a new read level and/or trim profile (as opposed to restarting the entire chip initialization process from the beginning).

For example, the automatic chip initialization retry process can perform an operation to execute a number of attempts to initialize the device using different read levels and/or trim profiles. The values for read voltage and/or source bias for each chip initialization process attempt can be maintained on a trim table. The operation can continue until the number of attempts equals a maximum number of attempts. In some embodiments, the maximum number of attempts is four, including the initial attempt that failed before the automatic chip initialization retry process was triggered. If the number of attempts equals the maximum number of attempts and the initialization ends with failure, another initialization command (e.g., another FFh command or FDh command) can be provided to restart the chip initialization process at the initial read level. After successful device initialization, the automatic chip initialization retry values (e.g., read level) found during the process can be retained (as opposed to being reset to the initial values). This can be useful in the event that a user-selectable trim profile (USTP) command is provided to initiate a trim profile operation that modifies one or more trim registers. In the event of a power-loss event or receiving an FDh command, the automatic chip initialization retry values can be lost and reset to the initial values.

Advantages of the present disclosure include, but are not limited to, lower cost, higher yield, and improved reliability and performance. For example, the automatic chip initialization retry can hide the initialization retry overhead from the host system, thereby improving reliability. Moreover, a self-consistent chip initialization can be achieved by moving complexity for performing the initialization retry from a memory sub-system controller to the non-volatile memory.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

The memory sub-system 110 includes a chip initialization component 113. In some embodiments, local media controller 135 includes at least a portion of the chip initialization component 113 and is configured to perform the functionality described herein. In some embodiments, the chip initialization component 113 is part of the host system 110, an application, or an operating system. In other embodiments, the memory sub-system controller 115 includes at least a portion of chip initialization component 113.

The chip initialization component 113 can implement a chip initialization process including automatic chip initialization retry. Further details with regards to the operations of the chip initialization component 113 are described below.

Figure 2:
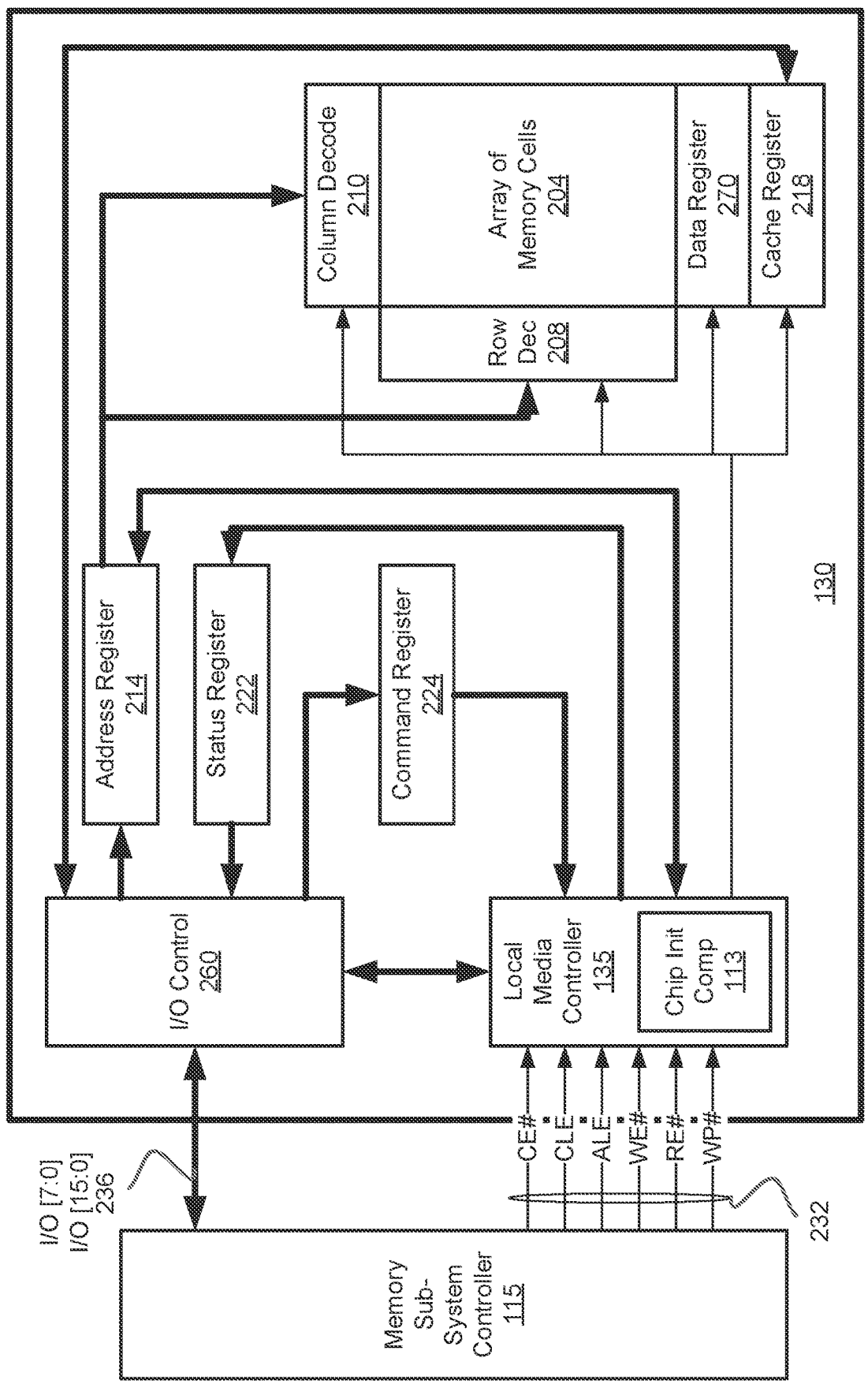
FIG. 2 is a block diagram of a memory device in communication with a memory sub-system controller of a memory sub-system in accordance with some embodiments of the present disclosure.

FIG. 2 is a simplified block diagram of a first apparatus, in the form of a memory device 130, in communication with a second apparatus, in the form of a memory sub-system controller 115 of a memory sub-system (e.g., memory sub-system 110 of FIG. 1), according to an embodiment. Some examples of electronic systems include personal computers, personal digital assistants (PDAs), digital cameras, digital media players, digital recorders, games, appliances, vehicles, wireless devices, mobile telephones and the like. The memory sub-system controller 115 (e.g., a controller external to the memory device 130), may be a memory controller or other external host device.

Memory device 130 includes an array of memory cells 204 logically arranged in rows and columns. Memory cells of a logical row are typically connected to the same access line (e.g., a wordline) while memory cells of a logical column are typically selectively connected to the same data line (e.g., a bit line). A single access line may be associated with more than one logical row of memory cells and a single data line may be associated with more than one logical column. Memory cells (not shown in FIG. 2) of at least a portion of array of memory cells 204 are capable of being programmed to one of at least two target data states.

Row decode circuitry 208 and column decode circuitry 210 are provided to decode address signals. Address signals are received and decoded to access the array of memory cells 204. Memory device 130 also includes input/output (I/O) control circuitry 260 to manage input of commands, addresses and data to the memory device 130 as well as output of data and status information from the memory device 130. An address register 214 is in communication with I/O control circuitry 260 and row decode circuitry 208 and column decode circuitry 210 to latch the address signals prior to decoding. A command register 224 is in communication with I/O control circuitry 260 and local media controller 135 to latch incoming commands.

A controller (e.g., the local media controller 135 internal to the memory device 130) controls access to the array of memory cells 204 in response to the commands and generates status information for the external memory sub-system controller 115, i.e., the local media controller 135 is configured to perform access operations (e.g., read operations, programming operations and/or erase operations) on the array of memory cells 204. The local media controller 135 is in communication with row decode circuitry 208 and column decode circuitry 210 to control the row decode circuitry 208 and column decode circuitry 210 in response to the addresses. In one embodiment, local media controller 135 includes the chip initialization component 113, which can implement the automatic chip initialization retry process described herein.

The local media controller 135 is also in communication with a cache register 218. Cache register 218 latches data, either incoming or outgoing, as directed by the local media controller 135 to temporarily store data while the array of memory cells 204 is busy writing or reading, respectively, other data. During a program operation (e.g., write operation), data may be passed from the cache register 218 to the data register 270 for transfer to the array of memory cells 204; then new data may be latched in the cache register 218 from the I/O control circuitry 260. During a read operation, data may be passed from the cache register 218 to the I/O control circuitry 260 for output to the memory sub-system controller 115; then new data may be passed from the data register 270 to the cache register 218. The cache register 218 and/or the data register 270 may form (e.g., may form a portion of) a page buffer of the memory device 130. A page buffer may further include sensing devices (not shown in FIG. 2) to sense a data state of a memory cell of the array of memory cells 204, e.g., by sensing a state of a data line connected to that memory cell. A status register 222 may be in communication with I/O control circuitry 260 and the local memory controller 135 to latch the status information for output to the memory sub-system controller 115.

Memory device 130 receives control signals at the memory sub-system controller 115 from the local media controller 135 over a control link 232. For example, the control signals can include a chip enable signal CE #, a command latch enable signal CLE, an address latch enable signal ALE, a write enable signal WE #, a read enable signal RE #, and a write protect signal WP #. Additional or alternative control signals (not shown) may be further received over control link 232 depending upon the nature of the memory device 130. In one embodiment, memory device 130 receives command signals (which represent commands), address signals (which represent addresses), and data signals (which represent data) from the memory sub-system controller 115 over a multiplexed input/output (I/O) bus 236 and outputs data to the memory sub-system controller 115 over I/O bus 236.

For example, the commands may be received over input/output (I/O) pins [7:0] of I/O bus 236 at I/O control circuitry 260 and may then be written into command register 224. The addresses may be received over input/output (I/O) pins [7:0] of I/O bus 236 at I/O control circuitry 260 and may then be written into address register 214. The data may be received over input/output (I/O) pins [7:0] for an 8-bit device or input/output (I/O) pins [15:0] for a 16-bit device at I/O control circuitry 260 and then may be written into cache register 218. The data may be subsequently written into data register 270 for programming the array of memory cells 204.

In an embodiment, cache register 218 may be omitted, and the data may be written directly into data register 270. Data may also be output over input/output (I/O) pins [7:0] for an 8-bit device or input/output (I/O) pins [15:0] for a 16-bit device. Although reference may be made to I/O pins, they may include any conductive node providing for electrical connection to the memory device 130 by an external device (e.g., the memory sub-system controller 115), such as conductive pads or conductive bumps as are commonly used.

It will be appreciated by those skilled in the art that additional circuitry and signals can be provided, and that the memory device 130 of FIG. 2 has been simplified. It should be recognized that the functionality of the various block components described with reference to FIG. 2 may not necessarily be segregated to distinct components or component portions of an integrated circuit device. For example, a single component or component portion of an integrated circuit device could be adapted to perform the functionality of more than one block component of FIG. 2. Alternatively, one or more components or component portions of an integrated circuit device could be combined to perform the functionality of a single block component of FIG. 2. Additionally, while specific I/O pins are described in accordance with popular conventions for receipt and output of the various signals, it is noted that other combinations or numbers of I/O pins (or other I/O node structures) may be used in the various embodiments.

Figure 3:
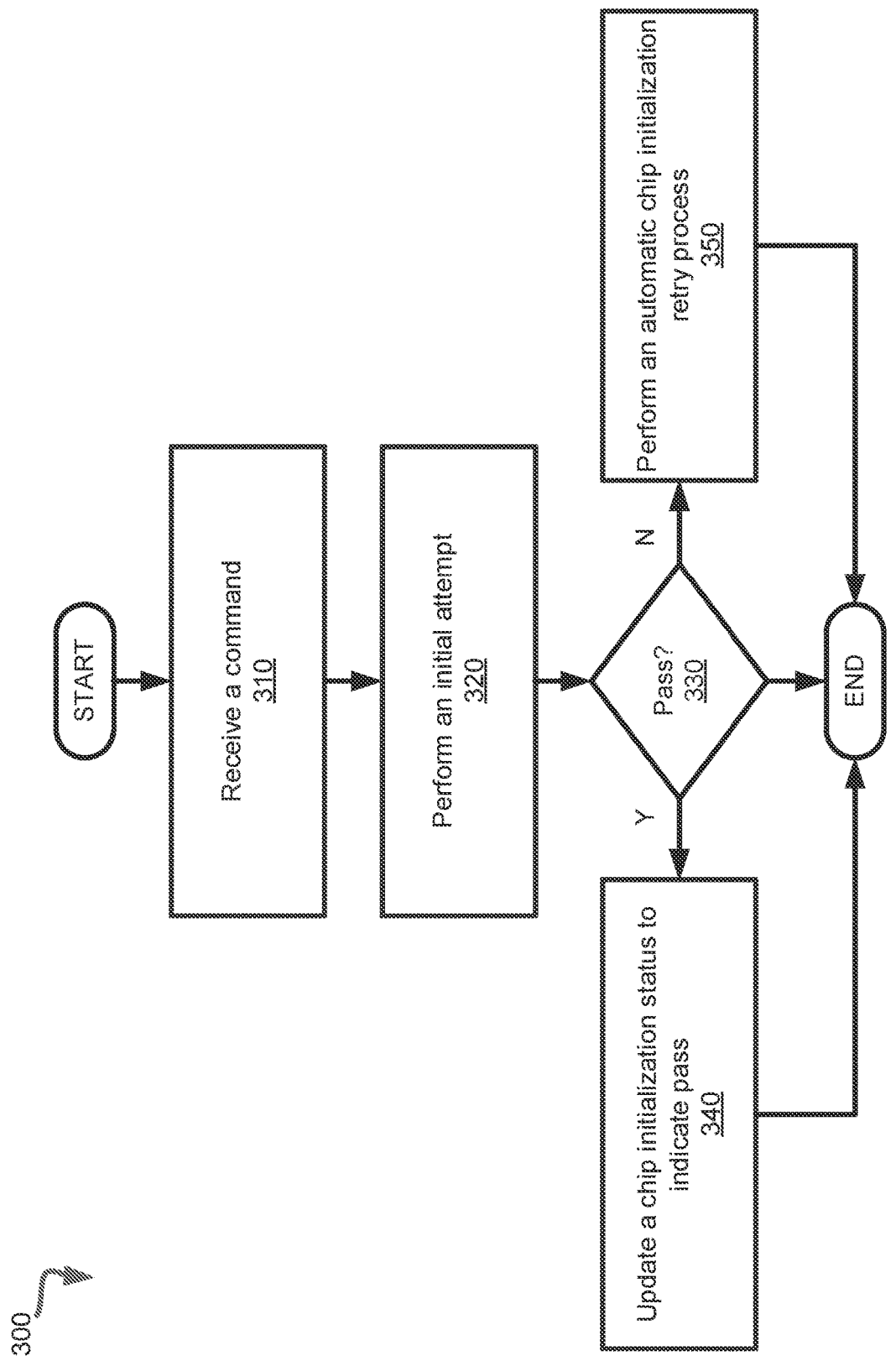
FIG. 3 is a flow diagram of an example method to implement chip initialization in accordance with some embodiments of the present disclosure.

FIG. 3 is a flow diagram of an example method 300 to implement chip initialization in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the chip initialization component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 310, a command is received. For example, the processing logic (e.g., chip initialization component 113) receives a command to initiate chip initialization. In one embodiment, the command is received from a requestor, such as memory sub-system controller 115 or host system 120, in response to a power-on event (e.g., when a power is supplied to turn on a memory device from an unpowered or "off" state). In some embodiments, the command is an FFh command corresponding to a feature address "h." In some embodiments, the command is an FDh command corresponding to a feature address "h."

At operation 320, an initial attempt is performed. For example, the processing logic can perform an initial attempt of a chip initialization process. In one embodiment, responsive to receiving the command, the processing logic can cause the initial attempt of the chip initialization process to be performed at an initial configuration. The initial configuration can include an initial set of control settings for reading a block of a memory array during the initial attempt. For example, the initial configuration can include an initial read (voltage) level that can be applied with respect to a wordline of a memory array of a memory device (e.g., memory device 130), an initial source (bias) level that can be applied with respect to a bitline of the memory array.

In one embodiment, chip initialization component 113 can perform the chip initialization process by reading a block having a number of sections using the initial set of control settings. For example, the initial attempt performed at operation 320 is performed by reading the block at an initial read level. The block can be stored on the memory device (e.g., NAND device). For example, the block can include a redundancy section and one or more trim sections. The one or more trim sections can include a static trim section and a dynamic trim section. In some embodiments, the chip initialization process can be performed on a primary block and a backup block. The term "primary block" refers to a primary copy of the block. The backup block is a copy of the block that exists to maintain data redundancy in the event that there are too many failures or defects on the primary block.

During the chip initialization process, the processing logic performs a read operation on the block (e.g., primary block or backup block) at a read level (e.g., the initial read level) to obtain information related to the memory device (e.g., NAND device). Then, the processing logic performs a transfer operation to store the information into an auxiliary memory device. The auxiliary memory device can be a memory device that can provide on-the-fly data availability for the memory device. For example, the auxiliary memory device can be a volatile memory device (e.g., an internal SRAM device). The read and transfer operations can be performed a suitable number of times to ensure that all of the data from the block is read and transferred to the auxiliary memory device.

At operation 330, the processing logic determines whether the initial attempt has passed. The initial attempt can be determined to pass if the initial attempt performed on the primary block or the backup block is successful. For example, the initial attempt can be determined to pass if all of the read and transfer operations were successfully performed to move the data from the primary block or the backup block to the auxiliary memory device.

If the initial attempt is determined to pass, then, at operation 340, a chip initialization status is updated to indicate a pass. For example, the processing logic can cause the update to the chip initialization status. In some embodiments, the processing logic causes a status register to be updated to indicate a pass. For example, the status register can be updated to "0" to indicate a pass (where a "1" indicates a fail).

If the initial attempt has failed, then, at operation 350, an automatic chip initialization retry process is performed. For example, the processing logic can cause the automatic chip initialization process to be performed. If a primary block and a backup block exist, the initial attempt can be determined to fail if the initial attempt performed on both the primary block and the backup block fails.

As will be described in further detail below with reference to FIG. 4, the automatic chip initialization retry process performs an additional attempt of the chip initialization process at a second configuration. The second configuration can include a second set of control settings (e.g., read level and source level) different from the initial set of control settings. For example, the second configuration can include a read level having a lower value or a higher value than the initial read level to address threshold voltage variations or shifts, such as that resulting from slow charge loss. If the additional attempt does not pass, then a third additional attempt of the chip initialization process can be performed at a third configuration including a third set of control settings different from both the initial and second sets of control settings, and so on. A maximum number of attempts of the chip initialization process can be set.

If a pass is not achieved after a maximum number of attempts, a new command can be received to re-initiate chip initialization. The maximum number of attempts can include any suitable number of attempts in accordance with the embodiments described herein. For example, the maximum number of attempts can be four attempts, including the initial attempt of the chip initialization process performed at operation 320 (i.e., three additional attempts are performed during the automatic chip initialization retry process performed at operation 350). In this example, two of the additional attempts can be performed at a lower read level than the initial read level, and one of the attempts can be performed at a higher read level than the initial read level.

Figure 4:
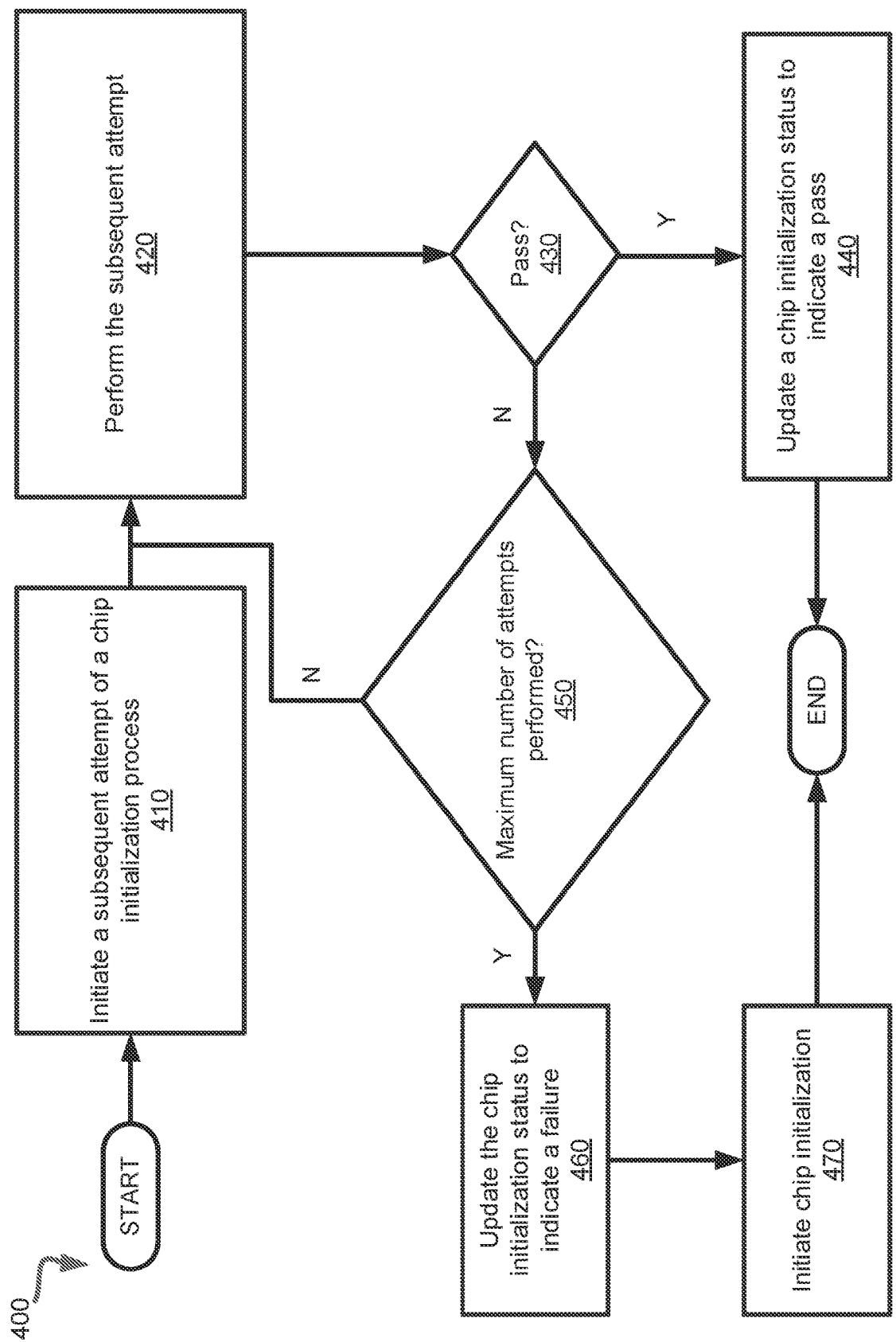
FIG. 4 is a flow diagram of an example method to implement automatic chip initialization retry, in accordance with some embodiments of the present disclosure.

FIG. 4 is a flow diagram of an example method 400 to implement automatic chip initialization retry in accordance with some embodiments of the present disclosure. For example, the method 400 can be performed as part of operation 350 of the chip initialization method of FIG. 3. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the chip initialization component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, a subsequent attempt of a chip initialization process is initiated after a previous attempt of the chip initialization process failed. For example, the processing logic (e.g., chip initialization component 113) can initiate the subsequent attempt of a chip initialization process after the previous attempt failed, where the previous attempt is performed at a first configuration (e.g., first read level and first source level). In some embodiments, the previous attempt is an initial attempt of the chip initialization process (e.g., the initial attempt performed at operation 320 of FIG. 3). In some embodiments, the previous attempt is an additional attempt performed after the initial attempt during the automatic chip initialization retry.

At operation 420, the subsequent attempt is performed. For example, the processing logic can cause the subsequent attempt to be performed at a second configuration (e.g., second read level and second source level) different from the first configuration. As described above with reference to FIG. 3, the subsequent attempt can be performed on at least one block (e.g., a primary block and/or a backup block) by performing a suitable number of read operations and transfer operations using the second read level to move data from the block to an auxiliary memory device (e.g., volatile memory device). For example, the second read level can have a lower value than the first read level. As another example, the second read level can have a higher value than the first read level.

At operation 430, the processing logic determines whether the subsequent attempt has passed. If so, at operation 440, a chip initialization status is updated to indicate a pass. For example, the processing logic can cause the update to the chip initialization status. In some embodiments, the processing logic causes a status register to be updated to indicate a pass. For example, the status register is updated to "0" to indicate a pass (where a "1" indicates a fail). Since the chip initialization has passed, the process ends.

If the processing logic determines that the subsequent attempt has failed, then, at operation 450, the processing logic determines whether a maximum number of attempts of the chip initialization process have been performed. More specifically, the processing logic determines if a number of attempts is equal to the maximum number of attempts. The maximum number of attempts can include any suitable number of attempts in accordance with the embodiments described herein. Illustratively, the maximum number of attempts can be selected based on a set of pre-determined read levels that can be tried.

For example, the maximum number of attempts can be four attempts, including the initial attempt of the chip initialization process (e.g., the initial attempt performed at operation 320 of FIG. 3). In other words, three additional attempts after the initial attempt can be performed during the automatic chip initialization retry process, with each additional attempt corresponding to a different read level of the set of pre-determined read levels. For example, the set of pre-defined read levels can include two lower read levels having lower values than the initial read level and one higher read level having a greater value than the initial read level, such that two of the three additional attempts can each correspond to one of the two lower read levels, while one of the three additional attempts can correspond to the higher read level.

If the number of attempts is less than the maximum number of attempts, then the process reverts back to operation 420 to perform another subsequent attempt of the chip initialization process at a third configuration (e.g., third read level and third source level) different from the first and second configurations. For example, the third read level can have a lower value than the first read level. As another example, the third read level can have a higher value than the first read level.

However, if the number of attempts is equal to the maximum number of attempts, then the chip initialization is deemed to have failed. Thus, at operation 460, the chip initialization status is updated to indicate a failure. For example, the processing logic can cause the chip initialization status to be updated to indicate the failure. In some embodiments, the processing logic causes a status register to be updated to indicate the failure. For example, the status register is updated to "1."

At operation 470, chip initialization is initiated. For example, the processing logic can receive a new command to initiate the chip initialization. The new command can be received from the memory sub-system controller, similar to operation 310 of FIG. 3. The chip initialization can include an initial attempt of a chip initialization process performed at an initial read level, similar to operation 320 of FIG. 3.

Figure 5:
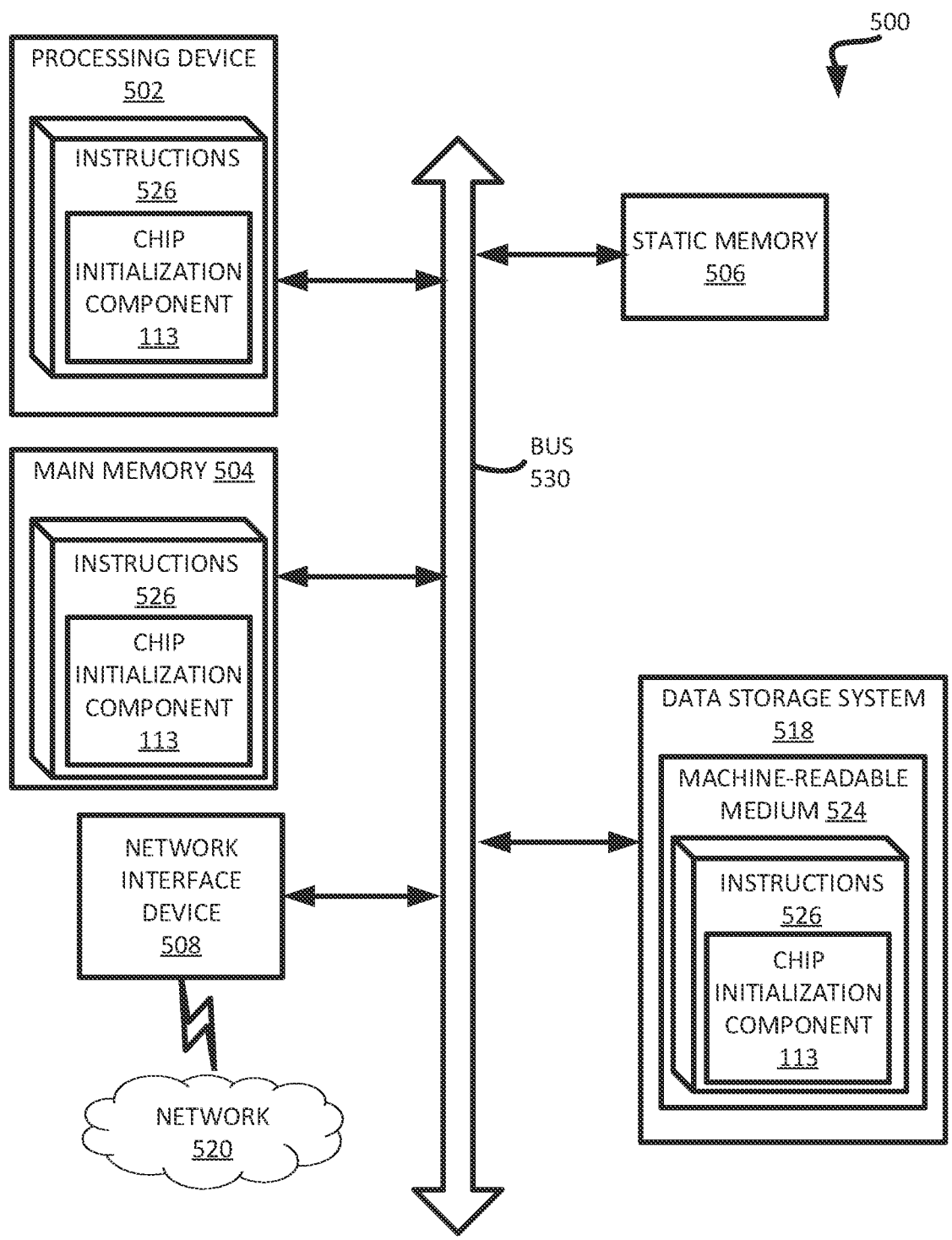
FIG. 5 is a block diagram of an example computer system in which embodiments of the present disclosure may operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the chip initialization component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or RDRAM, etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 400, the main memory 504 and the processing device 502 also constituting machine-readable storage media. The machine-readable storage medium 524, data storage system 518, and/or main memory 604 can correspond to the memory sub-system 110 of FIG. 1.

In one embodiment, the instructions 526 include instructions to implement functionality corresponding to a chip initialization component (e.g., the chip initialization component 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A memory device comprising:
a memory array; and
control logic, operatively coupled with the memory array, to perform operations comprising:
causing, during chip initialization, a first attempt of a chip initialization process to be performed based on a first configuration, wherein the first configuration comprises a first set of control settings for reading a block of the memory array during the first attempt;
determining that the first attempt has failed; and
in response to determining that the first attempt has failed, causing an automatic chip initialization retry process to be performed, wherein causing the automatic chip initialization retry process to be performed comprises causing a second attempt of the chip initialization process to be performed using a second configuration, and wherein the second configuration comprises a second set of control settings different from the first set of control settings for reading the block during the second attempt.

2. The memory device of claim 1, wherein the operations further comprise receiving a command to initiate the chip initialization prior to performing the first attempt, and wherein the automatic chip initialization retry process is performed without receiving a second command.

3. The memory device of claim 1, wherein the operations further comprise:

determining that the second attempt has passed; and in response to determining that the second attempt has passed, causing an update to a chip initialization status to indicate a pass.

4. The memory device of claim 1, wherein the operations further comprise:

determining that the second attempt has failed; and in response to determining that the second attempt has failed, determining whether a maximum number of attempts of the chip initialization process has been performed.

5. The memory device of claim 4, wherein the operations further comprise, in response to determining that the maximum number of attempts of the chip initialization process has been performed, causing an update to a chip initialization status to indicate a failure.

6. The memory device of claim 4, wherein the operations further comprise, in response to determining that the maximum number of attempts of the chip initialization process has not been performed, causing a third attempt of the chip initialization process to be performed using a third configuration, and wherein the third configuration comprises a third set of control settings different from the first set of control settings and the second set of control settings for reading the block during the third attempt.

7. The memory device of claim 1, wherein causing the first attempt to be performed comprises:

causing one or more read operations to be performed on at least one block at a first read level to obtain information related to the memory device; and causing one or more transfer operations to be performed to transfer the information to an auxiliary memory device.

8. The memory device of claim 7, wherein the at least one block comprises a primary block and a backup block, and wherein determining that the first attempt has failed comprises determining a failure with respect to the primary block and the backup block.

9. A method comprising:

causing, by a processing device, during chip initialization, a first attempt of a chip initialization process to be performed based on an first configuration, wherein the first configuration comprises a first set of control settings for reading a block of a memory array during the first attempt;

determining, by the processing device, that the first attempt has failed; and in response to determining that the first attempt has failed, causing, by the processing device, an automatic chip initialization retry process to be performed, wherein causing the automatic chip initialization retry process to be performed comprises causing a second attempt of the chip initialization process to be performed using a second configuration, and wherein the second configuration comprises a second set of control settings different from the first set of control settings for reading the block during the second attempt.

10. The method of claim 9, further comprising receiving, by the processing device, a command to initiate the chip initialization prior to performing the first attempt, wherein the automatic chip initialization retry process is performed without receiving a second command.

11. The method of claim 9, further comprising:

determining, by the processing device, that the second attempt has passed; and in response to determining that the second attempt has passed, causing, by the processing device, an update to a chip initialization status to indicate a pass.

12. The method of claim 9, further comprising:

determining, by the processing device, that the second attempt has failed; and in response to determining that the second attempt has failed, determining, by the processing device, whether a maximum number of attempts of the chip initialization process has been performed.

13. The method of claim 12, further comprising, in response to determining that the maximum number of attempts of the chip initialization process has been performed, causing, by the processing device, an update to a chip initialization status to indicate a failure.

14. The method of claim 12, further comprising, in response to determining that the maximum number of attempts of the chip initialization process has not been performed, causing, by the processing device, a third attempt of the chip initialization process to be performed using a third configuration, wherein the third configuration comprises a third set of control settings different from the first set of control settings and the second set of control settings for reading the block during the third attempt.

15. The method of claim 9, wherein causing the first attempt to be performed comprises:

causing one or more read operations to be performed on at least one block at a first read level to obtain information related to a memory device; and causing one or more transfer operations to be performed to transfer the information to an auxiliary memory device.

16. The method of claim 15, wherein the at least one block comprises a primary block and a backup block, and wherein determining that the first attempt has failed comprises determining a failure with respect to the primary block and the backup block.

17. A method comprising:

after a first attempt of a chip initialization process using a first configuration has failed, causing a second attempt of the chip initialization process to be performed using a second configuration, wherein the first configuration comprises a first set of control sets for reading a block of a memory array and, wherein the second configuration comprises a second set of control settings different from the first set of control settings for reading the block during the second attempt;

determining that the second attempt has failed;

in response to determining that the second attempt has failed, determining whether a number of attempts including the first attempt and the second attempt is equal to a maximum number of attempts of the chip initialization process;

in response to determining that the number of attempts is equal to the maximum number of attempts, causing an update to a chip initialization status to indicate a failure; and in response to determining that the number of attempts is less than the maximum number of attempts, causing a third attempt of the chip initialization process to be performed using a third configuration, wherein the third configuration comprises a third set of control settings different from the first set of control settings and the second set of control settings for reading the block during the third attempt.

18. The method of claim 17, wherein the first attempt is an initial attempt of the chip initialization process, and wherein the second and third attempts are performed during an automatic chip initialization retry process.

19. The method of claim 17, wherein causing the first attempt to be performed comprises causing one or more read operations to be performed on at least one block at a first read level to obtain information related to a memory device, and causing one or more transfer operations to be performed to transfer the information to an auxiliary memory device.

20. The method of claim 19, wherein the at least one block comprises a primary block and a backup block, and wherein determining that the first attempt has failed comprises determining a failure with respect to the primary block and the backup block.

* * * * *